(12) United States Patent
Akgun et al.

(10) Patent No.: US 7,610,983 B2
(45) Date of Patent: Nov. 3, 2009

(54) METHOD FOR DAMAGE LIMITATION IN THE EVENT OF AN OFFSET FRONTAL COLLISION, AND MOTOR VEHICLE HAVING AN APPARATUS WHICH SERVES FOR THIS PURPOSE

(75) Inventors: Toros Akgun, Graz (AT); Stephan Winkler, Graz (AT); Wolfgang Hirschberg, Graz (AT); Christian Kaltenmesser, Wels (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 273 days.

(21) Appl. No.: 10/577,755

(22) PCT Filed: Oct. 11, 2004

(86) PCT No.: PCT/AT2004/000343

§ 371 (c)(1),
(2), (4) Date: Jan. 25, 2007

(87) PCT Pub. No.: WO2005/042335

PCT Pub. Date: May 12, 2005

(65) Prior Publication Data

US 2007/0125588 A1 Jun. 7, 2007

(30) Foreign Application Priority Data

Oct. 31, 2003 (AT) .............................. GM754/2003

(51) Int. Cl.
*B60D 1/28* (2006.01)
*B60K 28/00* (2006.01)
*B60L 3/00* (2006.01)

(52) U.S. Cl. ........................ 180/271; 180/280; 180/282
(58) Field of Classification Search ................. 180/271, 180/280, 282
See application file for complete search history.

(56) References Cited

U.S. PATENT DOCUMENTS

| | | | | |
|---|---|---|---|---|
| 5,275,436 | A | * | 1/1994 | Pomero ....................... 280/784 |
| 5,482,322 | A | * | 1/1996 | Wheatley et al. ............. 280/784 |
| 6,516,258 | B1 | * | 2/2003 | Herrmann ..................... 701/45 |
| 2004/0262067 | A1 | * | 12/2004 | Sawada et al. ............... 180/282 |
| 2005/0217917 | A1 | * | 10/2005 | Salib et al. .................. 180/282 |
| 2007/0100527 | A1 | * | 5/2007 | Rao et al. ..................... 701/45 |

FOREIGN PATENT DOCUMENTS

| | | | |
|---|---|---|---|
| DE | 10113098 | * | 9/2002 |
| EP | 1125826 | * | 1/2001 |

\* cited by examiner

*Primary Examiner*—Toan C To
(74) *Attorney, Agent, or Firm*—Bachman & LaPointe, P.C.

(57) ABSTRACT

A method for damage limitation in the event of an offset frontal collision between two motor vehicles, with a first signal which signals an imminent collision triggering the steerable front wheels (9, 10) to turn inward in opposite directions, is to minimize the impact-induced yaw moment. To this end, the steerable wheels are moved back to the initial position again after the collision or if the collision has not taken place at all. To this end, two actuators (17', 17") with an external power source are provided in the case of a vehicle which is equipped for this purpose, with each actuator being associated with a steerable wheel (9, 10).

9 Claims, 4 Drawing Sheets

Figure 1:
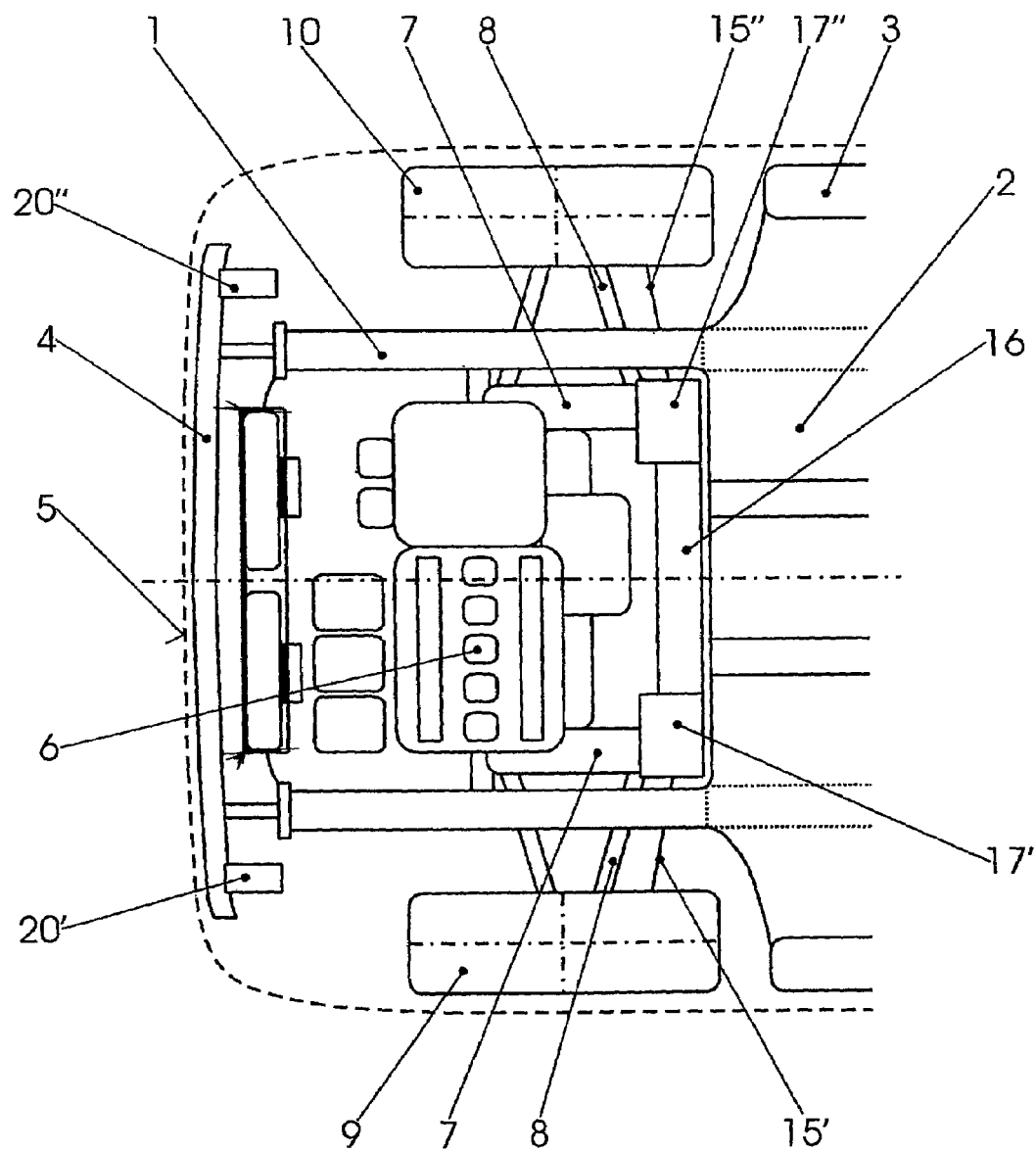

METHOD FOR DAMAGE LIMITATION IN THE EVENT OF AN OFFSET FRONTAL COLLISION, AND MOTOR VEHICLE HAVING AN APPARATUS WHICH SERVES FOR THIS PURPOSE

BACKGROUND OF THE INVENTION

The invention relates to a method for damage limitation in the event of an offset frontal collision between two motor vehicles, and to a motor vehicle having an apparatus which serves for this purpose. An offset frontal collision is to be understood as a frontal collision in which the vehicles move toward one another with directional vectors which are substantially parallel but laterally offset in relation to one another. The collision zone is therefore only a lateral part of the car in front.

In vehicles, this lateral part in front of the passenger compartment is usually less rigid than the central part in front of the passenger compartment and also absorbs less collision energy, resulting in considerable deformation of the passenger compartment. In particular, there is a risk of the respective wheel entering the passenger space, what is known as an intrusion zone. Furthermore, a particularly dangerous phenomenon also generally occurs in the event of such collisions: even in the event of a relatively small offset, the front wheels of the two vehicles on the collision side interengage with one another. As a result, the wheels are not only subject to particularly severe longitudinal forces which push them toward the passenger space, but the two vehicles are connected to one another in a partially interlocking manner and thus prevent them passing each other by. The kinetic energy of the two vehicles which hit one another eccentrically also causes the two vehicles which then interengage with one another to twist about the vertical axis.

This phenomenon is known in the literature under the term "interengaging". One countermeasure is known from WO 02/094618 A1—on which the invention is based—in that a signal which signals that a collision is beginning or is soon imminent explosively and irrevocably triggers the steerable front wheels to turn in such a way that the plane of the wheel on the collision side intersects the vertical longitudinal center plane of the vehicle, in front of said vehicle. This "positive" turning of the wheel on the collision side means that said wheel cannot interengage with the wheel on the collision side of the collision partner; the outer face of the rim of the wheel acts rather like a protective shield at which the other vehicle or its wheel on the collision side is deflected away. In order to counteract the impact torque about the yaw axis which is exerted here, the wheel which is not on the collision side is turned in the opposite direction, that is to say likewise inward. The basic outline of the plane of the wheels then forms a V with the apex located in front of the vehicle.

However, this procedure is still not good enough for two reasons:
1. When the collision takes place, an impact torque about the yaw axis acts on the vehicle and threatens to throw it off course.
2. If the collision is prevented at the last moment, that is to say the collision does not take place after all when the wheels are already turned, the vehicle cannot be steered and cannot be driven further because the wheels are irrevocably turned.

The invention is consequently based on the object of providing a remedy in these two regards. The aim is to minimize the impact-induced yaw moment and to be able to drive said vehicle further after a collision which did not take place after all.

SUMMARY OF THE INVENTION

According to the invention, the object is achieved in that at least one of the steerable wheels is very quickly moved back to the initial position again if either no collision has taken place within a certain time after the first signal or if a second signal which is transmitted by a further sensor signal the collision which actually occurs, with the initial position being the position which the wheels were in at the time the first signal was transmitted. The wheels are therefore moved back to the initial position in a suitable manner, depending on which of the two situations is present. The initial position is the position at the time at which the first signal predicts a probable collision, because the driver may have made a desperate bid to avoid the imminent collision.

The first signal is preferably generated by the direction and distance data which is repetitively recorded by a sensor being evaluated on the basis of criteria and transmitted when the result of the evaluation determines a collision probability which is above a predefined value.

When the second sensor (for example a deceleration sensor) determines the collision which actually occurs and transmits the second signal, it is advantageous for the steerable wheel on the collision side to be moved back to its initial position and the wheel which is not on the collision side to be left turned. The wheel which is not on the collision side is moved back to the initial position only when the yaw rate of the vehicle is virtually zero. This counteracts the rotation of the vehicle about the yaw axis which is caused by the collision, and prevents a possible secondary collision. When there is a yaw rate sensor, the time for which the wheel which is not on the collision side remains turned can be accurately measured.

In the other situation, in which the collision has not taken place after all, both wheels are moved back to their initial position again if the second signal is not transmitted within a specific period of time. The initial position is preferably the position before the first signal (which predicts the probability of a collision) because the driver may have made a desperate bid to avoid the imminent collision. The journey can therefore be continued without obstruction.

In one refinement of the method according to the invention, the first signal can trigger the wheels to turn at a time which depends on the speed at which the two vehicles approach one another. As a result, the wheels reach the turned position only immediately before the collision.

An inventive motor vehicle with steerable front wheels and a steering apparatus is distinguished in that at least one reversible actuator with a very fast-acting power source is provided in the steering apparatus and influences the turning of the steerable wheels via connecting elements such that the wheels can be turned both in opposite directions and at least one wheel can be moved back to the initial position. Connecting elements are understood to be tie rods, steering arms and/or the like. The important feature is that the actuator is reversible, that is to say it can also return to its initial position again in response to a command. Such an actuator is preferably an electric motor with corresponding conversion and/or transmission means.

In the preferred embodiment of the invention, two actuators which each have their own external power source are provided, with each actuator being associated with a steerable wheel. As a result, it is possible to return the steerable wheels to the initial position in a selective manner.

BREIF DESCRIPTION OF THE DRAWINGS

Figure 2:
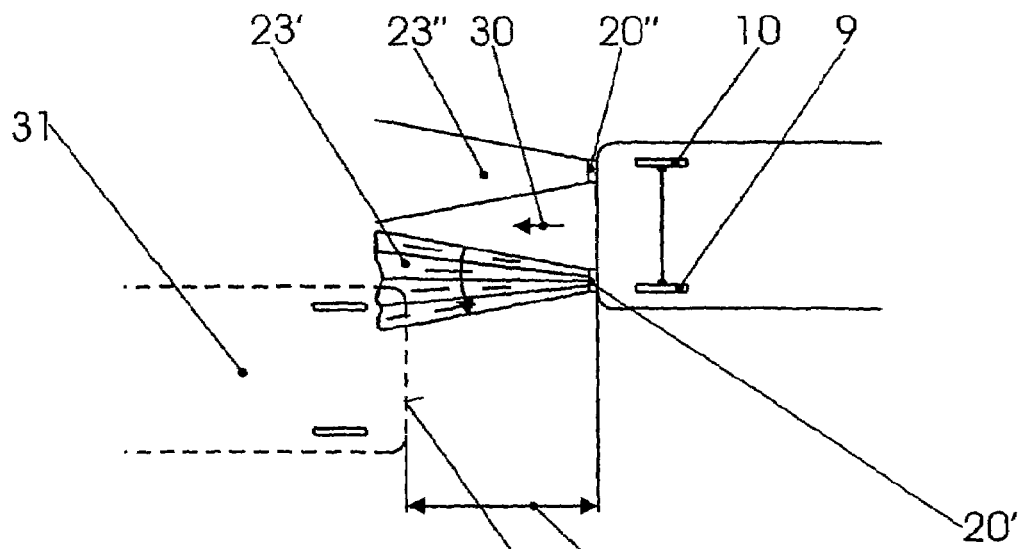
Figure 3:
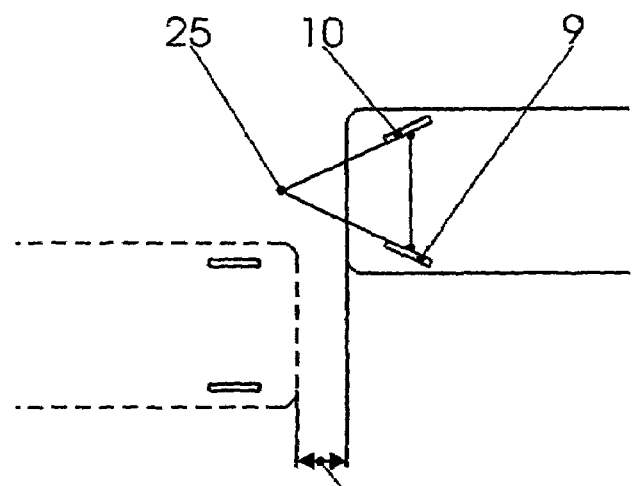
Figure 4:
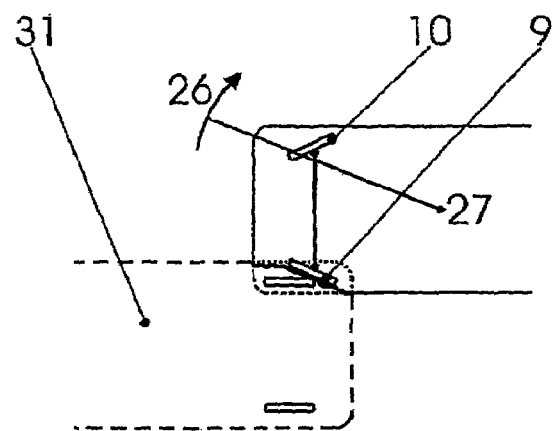
Figure 5:
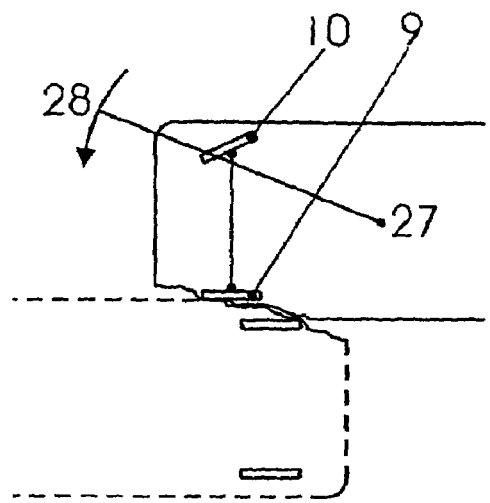
Figure 6:
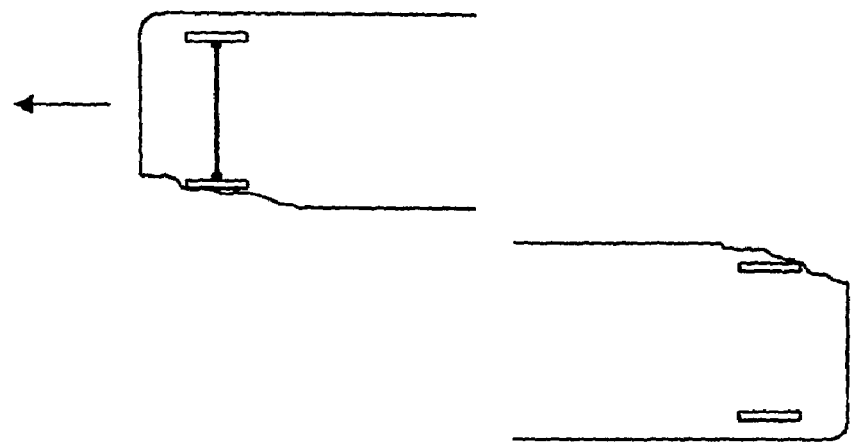
Figure 7:
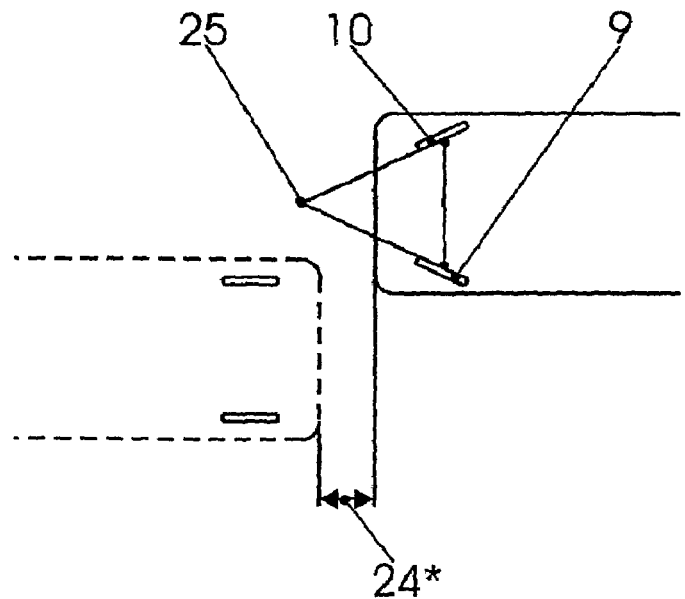
Figure 8:
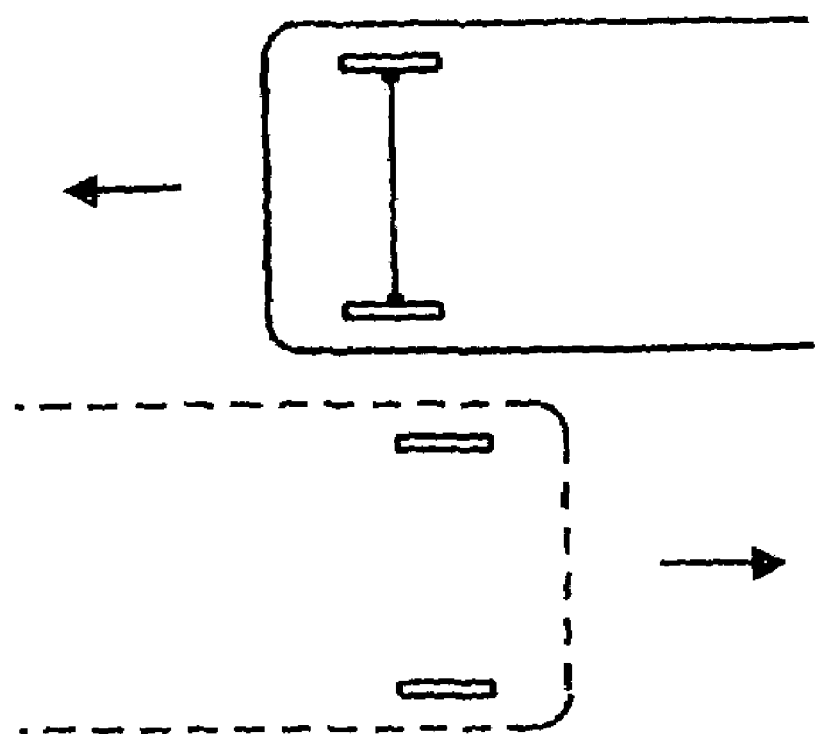

The invention is described and explained below with reference to drawings, in which:

FIG. 1: depicts a vehicle according to the invention,

FIG. 2: depicts said vehicle in a first phase;

FIG. 3: depicts said vehicle in a second phase, immediately before a collision,

FIG. 4: depicts said vehicle in a third phase, during the collision,

FIG. 5: depicts said vehicle in a fourth phase, immediately after the collision, FIG. 6: depicts said vehicle in a fifth phase, after the collision, FIG. 7: depicts said vehicle in a fourth phase, but when no collision has occurred, and FIG. 8: is a diagram relating to FIG. 1.

DETAILED DESCRIPTION

FIG. 1 schematically shows the front part of a motor vehicle which has equipment for executing the method according to the invention. Said front part comprises longitudinal frame supports 1 which adjoin a base plate 2 which for its part is laterally bounded by sills 3. The front end of the motor vehicle is formed by a bumper 4 which follows the front part of the vehicle contour 5 (dashed). An engine/transmission block 6 is merely indicated. Transverse links 8, for example, are guided on suspension supports 7 which are fixed to the longitudinal frame supports or are part of a chassis auxiliary frame. A left-hand front wheel 9 and a right-hand front wheel 10 are suspended in this way.

The two front wheels 9, 10 can be pivoted in the usual manner by means of steering arms 13, 14 which are acted on by a left-hand tie rod 15' and a right-hand tie rod 15". A steering gear mechanism 16 is provided between these tie-rod elements 15', 15" and, according to the invention, reversible actuators 17 (17', 17") are provided on both sides of the steering gear mechanism, said reversible actuators being actuated by a controller 18 via instruction lines 19. The actuation involves control signals which are obtained in the controller 18 by evaluating the signals from a first sensor 20 which is expediently fitted on the side which is closest to the center of the road, or, even better, the signals from two such sensors (20', 20"), one on each side and/or on the front of the vehicle. One example of a sensor of this type is a laser scanner which is designed and operates in the manner described in the article "Nahfeldüberwachung rund um das Fahrzeug: Der Laserscanner und seine Möglichkeiten zur Entlastung des Fahrers [Near-field monitoring all around the vehicle: The laser scanner and its possible uses for relieving the burden on the driver]" (Authors: Lages, Fürstenberg, Willhoeft, distributed in Berlin on May 3, 2003 at the VDI convention "The driver in the 21st century"). The signals from the first sensor are therefore "real-time" direction and distance signals. A deceleration sensor 22 which is connected to the controller 18 via signal lines 23 is also provided at a suitable point.

The reversible actuators 17 (17', 17") in each case act on one of the two tie-rod elements 15', 15" or directly on the steering arms 13, 14. These steering arms may be a rack-and-pinion steering system or any other desired steering system. In the case of a fully electronic steering system, the actuators 17 may also be the power-steering motors themselves.

FIG. 2 shows the motor vehicle (in solid lines), which is equipped according to the invention and moves forward in the direction and at the speed indicated by the arrow 30, immediately before an offset frontal collision with a collision partner 31 which has a contour 32 (dashed). The collision partner 31 does not need to be equipped according to the invention. At this time, the beam of the sensor 20' has already detected the direction and distance of the future collision partner 31. The probability of a collision increases as the distance 24 decreases. As soon as this probability has reached a predefined value (corresponding to a collision being fairly certainly imminent), the first signal is passed to the actuators 17', 17" on both sides.

FIG. 3 shows that the actuators 17', 17" turn the steerable front wheels 9, 10 in opposite directions at a minimum distance 24* from the collision partner 31, as late as possible. "In opposite directions" means that the imaginary planes of the wheels intersect one another at a point 25 in front of the vehicle.

The situation in FIG. 4 is as follows. The vehicles have collided. The contour 32 of the collision partner 31 has already entered the contour of our vehicle and is in contact with the turned wheel 9. To some extent, this forms a shield which pushes the vehicles apart and thus prevents the front wheels from interengaging. In the process, an impact torque (arrow 26) is exerted on our vehicle about its center of gravity 27. Even at the first moment of the collision, the deceleration sensor has responded and as a result—with a time delay—triggered a further signal to the actuator of the wheel 9 on the collision side. This further signal leads to FIG. 5.

In FIG. 5, the actuator has moved the wheel 9 back to its original position again, while the wheel 10 which was not involved in the collision remains turned inward. As a result, a torque (arrow 28) acts on the vehicle in the direction of rotation opposite the impact torque 26 from FIG. 4. The yawing movement of the vehicle is therefore disrupted given enough time and the vehicle roughly maintains its original course, but with a lateral offset. The risk of subsequent collisions with other vehicles is considerably reduced as a result. The amount of time needed to stop the yawing movement is either calculated by the controller, or a yaw angle sensor which signals this is provided. If this time is reached, the actuator which acts on the wheel 10 which was not involved in the collision is also supplied with the signal to move its wheel 10 back to the original position, see FIG. 6.

FIG. 7 alternatively adds to the situation in FIG. 3. If, specifically within a certain time following the two wheels being turned inward, no collision has taken place or is expected, that is to say the deceleration sensor 22 does not respond, both actuators are supplied with the further signal to return both turned wheels 9, 10 to their initial position again, and the journey can be continued.

The invention claimed is:

1. A method for damage limitation in the event of an offset frontal collision between two motor vehicles, with a first signal which signals an imminent collision triggering the steerable front wheels (9, 10) to turn inward from an initial position in opposite directions very quickly, wherein at least one of the steerable wheels is very quickly moved back to the initial position again if either no collision has taken place within a certain time after the first signal or if a second signal which is transmitted by a further sensor (22) signals the collision which actually occurs, with the initial position being the position which the wheels were in at the time the first signal was transmitted.

2. The method as claimed in claim 1, wherein the first signal is generated by a direction and distance data which is repetitively recorded by at least one sensor (20; 20', 20") being evaluated on a basis of criteria, and the first signal being transmitted when a result of the evaluation determines a collision probability which is above a predefined value.

3. The method as claimed in claim 1, wherein, when the second signal is transmitted, only the steerable wheel (9) on the collision side is moved back to its initial position and the other wheel (10) remains turned.

4. The method as claimed in claim 3, wherein the wheel (10) which is not on the collision side is moved back to the initial position only when the yaw rate of the vehicle is virtually zero.

5. The method as claimed in claim 1, wherein both wheels (9, 10) are moved back to their initial position again if the second signal is not transmitted within a specific period of time.

6. The method as claimed in claim 3, wherein the first signal triggers the wheels to turn at a time which depends on the speed at which the two vehicles approach one another.

7. A motor vehicle comprising an apparatus for damage limitation in the event of an offset frontal collision, wherein the motor vehicle has a steering apparatus (13, 14, 15, 16) which is associated with the front wheels (9, 10), at least one reversible actuator (17; 17', 17") with a very fast-acting power source is provided in the steering apparatus (13, 14, 15, 16) and influences the turning of the steerable wheels (9, 10) via connecting elements (15', 15") such that the wheels (9, 10) can be turned both in opposite directions from an initial position and at least one wheel (9) can be moved back to the initial position, the apparatus comprising means for generating a first signal for signalling an imminent collision and triggering the steerable front wheels (9, 10) to turn inward in opposite directions, first means for sensing that no collision has taken place within a certain time after the first signal, second means for generating a second signal for signalling that a collision has actually occurred, wherein at least one of the steerable wheels is very quickly moved back to the initial position upon a signal from either the first means or the second means.

8. The motor vehicle as claimed in claim 7, wherein two actuators (17', 17") with an external power source are provided, with each actuator being associated with a steerable wheel (9, 10).

9. The motor vehicle as claimed in claim 7, wherein the actuator (17; 17', 17") is an electric motor.

\* \* \* \* \*